US007017801B2

(12) United States Patent
Malich

(10) Patent No.: US 7,017,801 B2
(45) Date of Patent: Mar. 28, 2006

(54) METHOD AND SYSTEM FOR COMBINING LOTTERY TICKET TRANSACTION WITH SALES TRANSACTION

(76) Inventor: Alexandar D. Malich, 2519 Sarah St., Apt #2, Pittsburgh, PA (US) 15203

( * ) Notice: Subject to any disclaimer, the term of this patent is extended or adjusted under 35 U.S.C. 154(b) by 0 days.

(21) Appl. No.: 10/712,607

(22) Filed: Nov. 12, 2003

(65) Prior Publication Data

US 2004/0097284 A1 May 20, 2004

Related U.S. Application Data

(60) Provisional application No. 60/425,927, filed on Nov. 12, 2002.

(51) Int. Cl.
*G06F 17/00* (2006.01)

(52) U.S. Cl. ...................................................... 235/375

(58) Field of Classification Search ................ 235/381, 235/432, 456, 375, 380, 383, 382.5; 283/102, 283/114, 23; 705/30, 1
See application file for complete search history.

(56) References Cited

U.S. PATENT DOCUMENTS 4,241,943 A * 12/1980 Malinovitz .................. 283/102
5,129,652 A * 7/1992 Wilkinson .................. 273/139
5,216,595 A 6/1993 Protheroe
5,745,052 A * 4/1998 Matsuyama et al. ..... 340/932.2
6,028,920 A 2/2000 Carson
6,056,289 A 5/2000 Clapper
6,134,309 A 10/2000 Carson
6,263,316 B1 7/2001 Khan et al.
6,267,670 B1 7/2001 Walker et al.
6,364,206 B1 4/2002 Keohane
6,783,456 B1 * 8/2004 White ......................... 463/18
2001/0016514 A1 8/2001 Walker
2001/0045456 A1 * 11/2001 Smith ......................... 235/381
2003/0227134 A1 * 12/2003 Khal .......................... 273/269
2004/0176970 A1 * 9/2004 Paluszek et al. ............... 705/1
2005/0027623 A1 * 2/2005 Otero .......................... 705/30
2005/0107163 A1 * 5/2005 Nguyen et al. ............... 463/42

FOREIGN PATENT DOCUMENTS

EP 1122675 A2 8/2001
JP 2003242539 * 8/2003

* cited by examiner

*Primary Examiner*—Thien M. Le
(74) *Attorney, Agent, or Firm*—Brian Samuel Malkin

(57) ABSTRACT

The present invention provides methods and systems for combining lottery transactions with other sales transactions including pay-for-park services.

11 Claims, 3 Drawing Sheets

METHOD AND SYSTEM FOR COMBINING LOTTERY TICKET TRANSACTION WITH SALES TRANSACTION

CLAIM FOR PRIORITY

This application claims priority from the U.S. provisional application No. 60/425,927, filed on Nov. 12, 2002, which is incorporated herein by reference.

FIELD OF THE INVENTION

The present invention relates to a method and system for selling lottery tickets in combination with another sales transaction. More specifically, the present invention involves selling lottery tickets in combination with the receiving and paying for parking in a pay-for-park business.

BACKGROUND OF THE INVENTION

The International Parking Institute estimates that there are more than 105 million parking spaces in the U.S., a number that changes every day. The ratio of off-street spaces to on-street is roughly two-to-one. Apart from the daily commute to work, consumers use pay-for-park facilities to park their vehicles safely while on vacation, shopping, or staying in a hotel.

Typically, a consumer will enter a pay for park facility and receive a ticket indicating when entry occurred. The consumer then parks their car and proceeds to their ultimate destination. Upon returning, the consumer will present the parking ticket to a clerk or automated machine, be advised of the total parking charge, pay it, receive a receipt, and exit the pay for park facility.

Often, pay-for-park facilities are patronized based upon their proximity to given geographic features. For instance, on the day of football game, a pay-for-park facility closest to a football stadium will fill up first, then the next closest will fill up second and so on as the distance from the football stadium increases. However, football games and other events are usually no more than once per week. Thus, a pay-for-park facility will not have continued desirability based upon its proximity to the stadium.

Moreover, in some urban areas there are a myriad of pay-for-park facilities within close proximity to popular destinations such as office buildings, restaurants, cultural events, and other facilities for entertainment. Typically, a consumer choosing between park-for-park facilities may distinguish by price when the proximity to the desired destination is about the same. Thus, most pay-for-park facilities located within the same proximity charge approximately the same rates. Without a significant distinction between facilities, consumer patronization is rather random and business is not steady.

SUMMARY OF THE INVENTION

The present invention broadly contemplates a system for combining pay-for-park transactions and lottery ticket transactions, combining: an arrangement for issuing a parking ticket; an arrangement for selecting lottery numbers during payment of said parking ticket; an arrangement for entering said lottery numbers in at least one lottery; and an arrangement for dispensing at least one lottery ticket.

The present invention also contemplates a method for combining pay-for-park transactions and lottery ticket transaction, said method comprising the steps of: issuing a parking ticket; selecting lottery numbers during payment for said parking ticket; entering said selected lottery numbers in at least one lottery; and dispensing lottery ticket.

In another aspect, the present invention is a program storage device readable by machine, tangibly embodying a program of instructions executable by the machine to perform a method for combining pay-for-park transactions with lottery transactions, the method comprising the steps of: issuing a parking ticket; selecting lottery numbers during payment for said parking ticket; entering said selected lottery numbers in at least one lottery; and dispensing lottery ticket.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Lottery systems are used throughout the United States to aid in supporting governmental activities, decreasing the need for tax increases, providing additional revenues and entertainment to the public. Often, proceeds of these lotteries help to support state programs for senior citizens. The consumer may choose different types of lottery games and the number of games to purchase. In the case of a number-based lottery, the consumer may select the number and verbally direct a store clerk to enter the numbers into the lottery machine. The clerk may then present the consumer with a ticket memorializing the consumer's number selection. Since pay-for-park facilities typically dispense tickets as part of the retail transaction, it is convenient to combine the sales of lottery tickets with the pay-for-park transaction.

Accordingly, in the present invention, it is contemplated that the pay-for park transaction is combined with the purchase of at least one lottery ticket.

Figure 1:
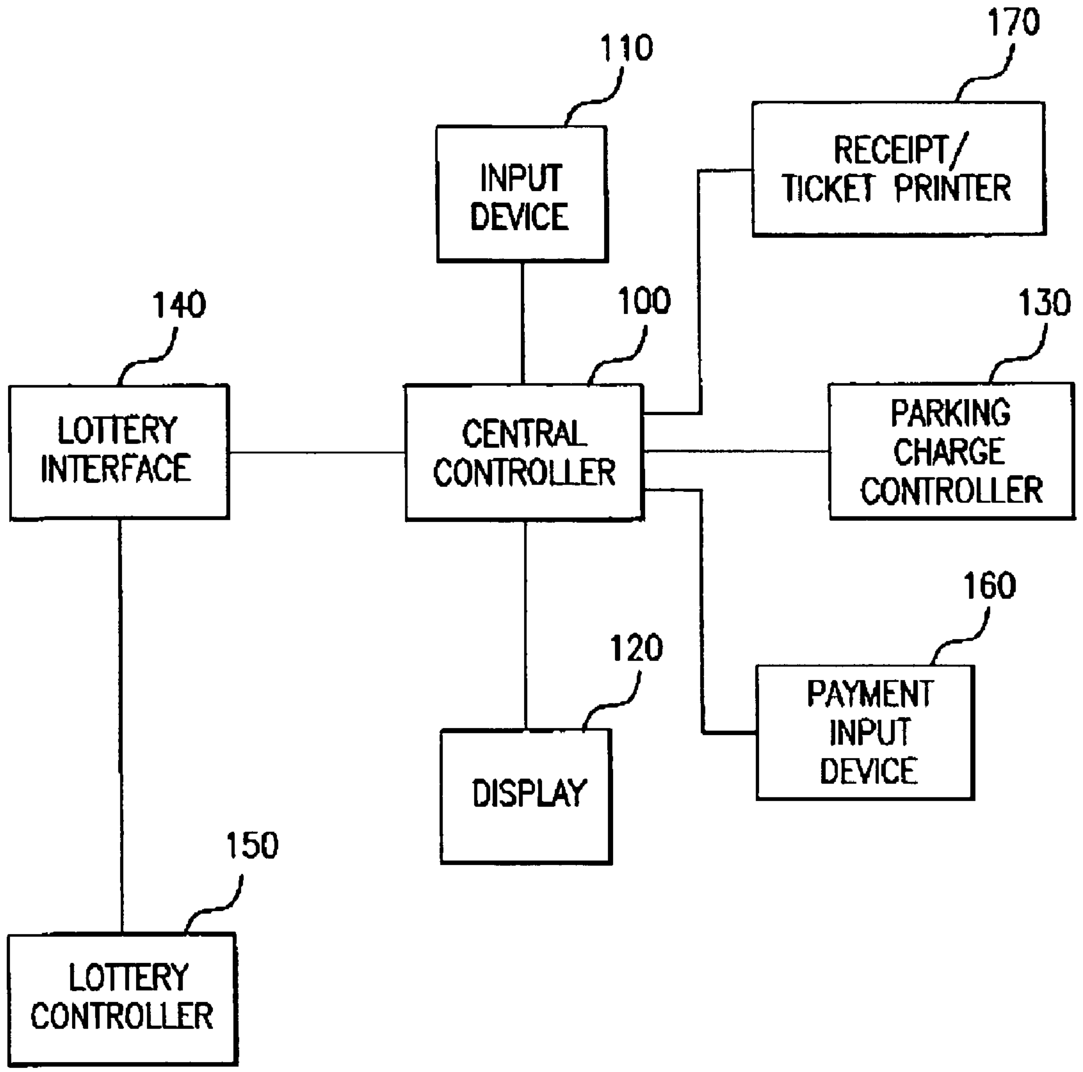
FIG. 1 is a block diagram depicting the relationship of the components of the combination parking ticket and lottery ticket dispensing method and apparatus in accordance with the present invention.

Turning now to FIG. 1, a bock diagram depicting the relationship of the components of the combination parking ticket and lottery ticket dispensing method is shown. We begin with central controller 100 operatively connected to an input device 110 and a display 120. Preferably, the input and display device will be a touch screen device, but other conventional keyboard input and display devices may be substituted. Central controller 100 is also operatively connected to lottery interface 140 and parking charge controller 130. Lottery interface 140 is in turn operatively connected to lottery controller 150. In at least one preferred embodiment of the present invention, a multiplicity of lottery controllers could be operatively connected to lottery interface 140. The consumer would have the option of choosing which lottery controller would be communicated with during a given transaction. The central controller 100 is also operatively connected to receipt/ticket printer 170 and a payment input device 160. Preferably, the receipt/ticket printer will be capable of dispensing both a lottery ticket and parking receipt on the same ticket. However, the invention may also be practiced with separate devices for printing lottery tickets and parking receipts. It should be understood that payment input device 160 is contemplated to include at least the capabilities of receiving paper money, credit cards, debit card, and pre-paid parking vouchers, but any other type of payment processing method is contemplated by the present invention.

Figure 2:
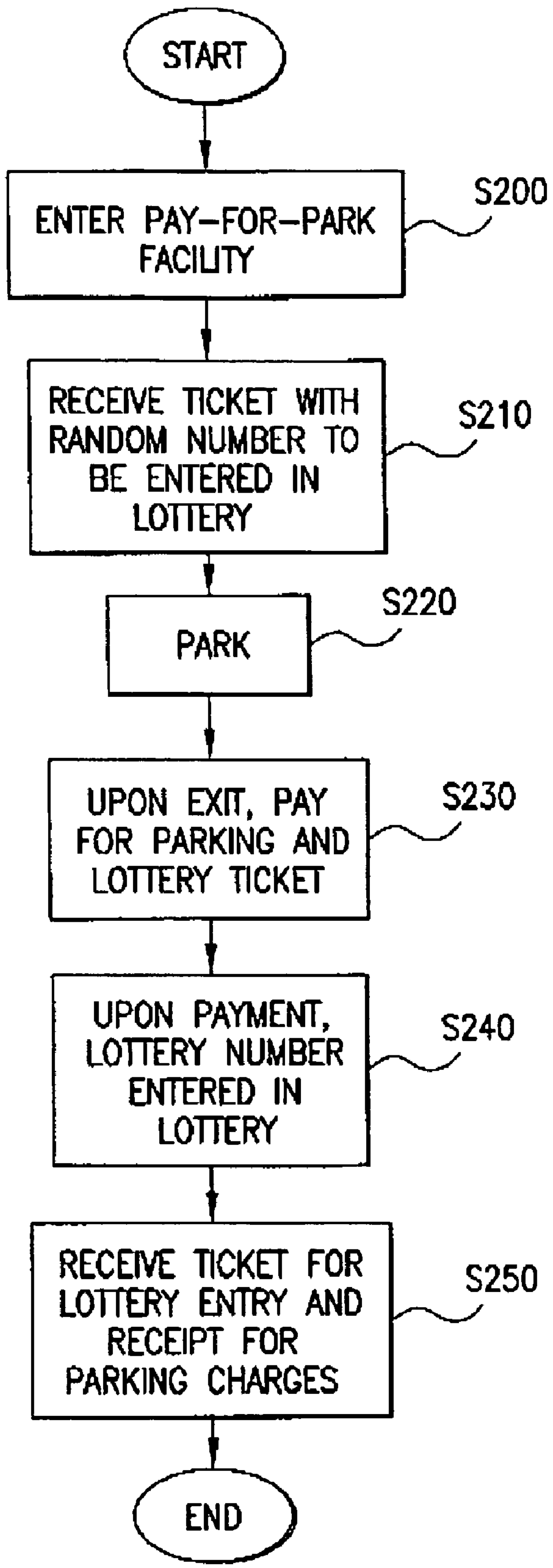
FIG. 2. is a flow diagram depicting the steps in the preferred method of combining parking ticket and lottery ticket dispensing in accordance with the present invention.

Turing now to FIG. 2, a flow diagram depicting the steps in the preferred method of combining parking ticket and lottery ticket transactions in accordance with the present invention is shown. At S200, the consumer enters a pay-for-park facility. Preferably, the pay-for-park facility has advertised by signage or other means that charges for the parking include the charge of entry of a randomly assigned lottery number in a lottery. At S210, upon entering the pay-for-park facility, the consumer receives a parking ticket. At S220, the consumer parks.

At S230, upon exiting the pay-for-park facility, the consumer pays for both the parking charges and the lottery ticket charges at the same time and makes one payment to the pay-for-park facility. Preferably, to save time and avoid the typical lines and inconvenience associated with purchasing lottery tickets, the invention contemplates one ticket with one randomly assigned number may be dispensed for each parking space used. However, in at least one embodiment of the present invention, at S230, the consumer may choose the lottery game to be played and the numbers to be entered in that lottery. At S240, upon payment, the lottery number is entered into the lottery. At S250, the consumer receives a ticket evidencing entry into the lottery and payment of parking charges. Preferably, to save paper, time, and inconvenience, the lottery ticket entry and the parking charges may appear on the same ticket.

Figure 3:
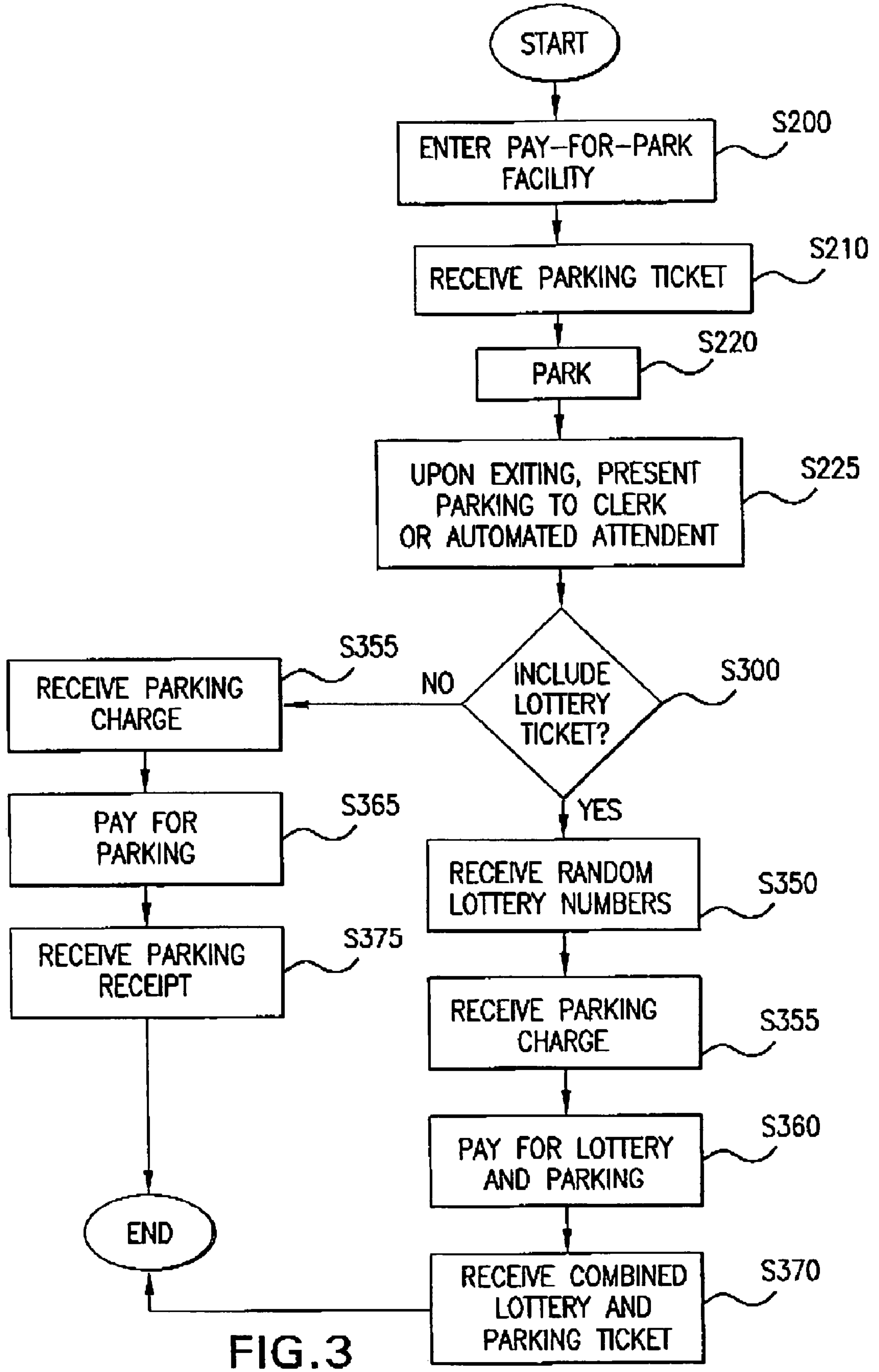
FIG. 3. is a flow diagram of an alterative embodiment of the present invention.

Turning now to FIG. 3, a flow diagram of an alterative embodiment of the present invention is shown. At S200, the consumer enters the pay-for-park facility. Next, at S210, the consumer receives a parking ticket. At S220, the consumer parks the vehicle. At S225, the consumer exits and presents the parking ticket to a clerk or automated parking payment machine. Next, at S300, the consumer is queried as to whether to include a lottery ticket purchase with the parking fee. If the consumer opts not to buy a lottery ticket, then at S355, the consumer is notified of the parking charge. At S365, the consumer pays the parking charge. At S375, the consumer receives a parking receipt.

If the consumer chooses to buy a lottery ticket, then at S350 it is preferred that a computer randomly selects numbers to be played in the lottery. It will be appreciated that, at this step, the consumer may opt to play multiple lottery games and numbers or just one game with one set of numbers or one game with multiple numbers entered. Alternatively, the consumer may select the numbers to be played. It will be appreciated that S350 may be executed during the process of receiving the ticket at S300, however the lottery numbers selected in this case would not entered until the consumer paid for the parking and lottery charges.

At S360, the consumer pays for the lottery and parking transactions. Next, at S370, the consumer receives a combined lottery and parking ticket. The steps of payment of parking charges and selection and payment for the lottery ticket may be interchanged. Preferably, they occur simultaneously.

It is to be understood that the present invention, in accordance with at least one preferred embodiment, includes a program storage device readable by machine, tangibly embodying a program of instructions executable by the machine to perform a method for combining pay-for-park transactions with lottery transactions, the method comprising the steps of: issuing a parking ticket; selecting lottery numbers during payment for said parking ticket; entering said selected lottery numbers in at least one lottery; and dispensing lottery ticket. Together these elements may be implemented on at least one general-general purpose computer running suitable software programs. These may be implemented on at least one Integrated Circuit or part of at least one Integrated Circuit. Thus, it is to be understood that the invention may be implemented on hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for combining pay-for-park transactions and state or province-owned and operated lottery ticket transactions, combining:

an arrangement for issuing a parking ticket;

wherein indicia for said parking transaction are printed on said parking ticket, an arrangement for simultaneously selecting and entering lottery numbers during payment of said parking ticket;

wherein payment of said parking ticket and payment for entry into the lottery occur simultaneously;

an arrangement for entering said lottery numbers in at least one government-sanctioned lottery;

wherein the indicia for said lottery are printed on said lottery ticket and an arrangement for dispensing at least one lottery ticket simultaneously with said parking ticket.

2. The system of claim 1, wherein the consumer selects the lottery numbers to be entered into the lottery.

3. The system of claim 1, wherein the lottery numbers are randomly selected by said central controller.

4. The system of claim 1, wherein the lottery numbers are randomly selected by a lottery controller.

5. The system of claim 1, wherein the lottery ticket includes a receipt for parking charges.

6. A method for combining pay-for-park transactions and state or province-owned and operated lottery ticket transaction, said method comprising the steps of:

issuing a parking ticket;

wherein indicia for said parking transaction are printed on said parking ticket, simultaneously selecting and entering lottery numbers during payment of said parking ticket;

wherein payment of said parking ticket and payment for entry into the lottery occur simultaneously;

entering said lottery numbers in at least one government-sanctioned lottery;

wherein the indicia for said lottery are printed on said lottery ticket and dispensing at least one lottery ticket simultaneously with said parking ticket.

7. The method of claim 6, wherein the consumer selects the lottery numbers.

8. The method of claim 6, wherein the lottery numbers are selected by a central controller.

9. The method of claim 6, wherein the lottery numbers are selected by a lottery controller.

10. The method of claim 6, wherein the lottery ticket includes a receipt for parking charges.

11. A program storage device readable by machine, tangibly embodying a program of instructions executable by the machine to perform a method for combining pay-for-park transactions and state or province-owned and operated lottery ticket transactions, the method comprising the steps of:

issuing a parking ticket;

wherein indicia for said parking transaction are printed on said parking ticket simultaneously selecting and entering lottery numbers during payment of said parking ticket;

wherein payment of said parking ticket and payment for entry into the lottery occur simultaneously;

entering said lottery numbers in at least one state or province-owned and operated lottery;

wherein the indicia for said lottery are printed on said lottery ticket and dispensing at least one lottery ticket simultaneously with said parking ticket.

* * * * *